Feb. 23, 1965  A. L. HUBBARD  3,170,277
COTTON HARVESTER CLEANING SCREEN
Filed Nov. 23, 1962
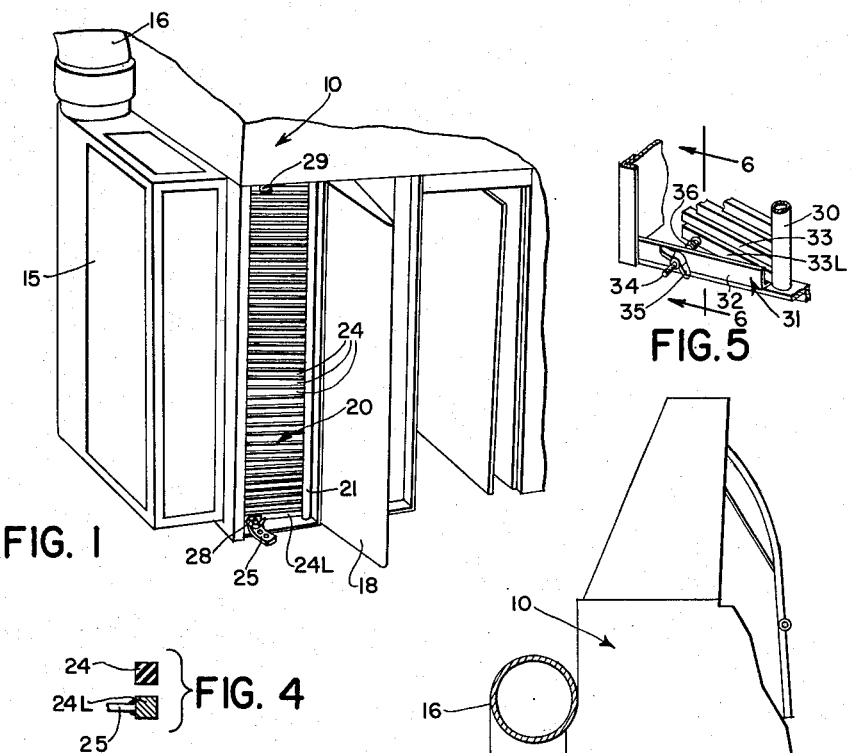
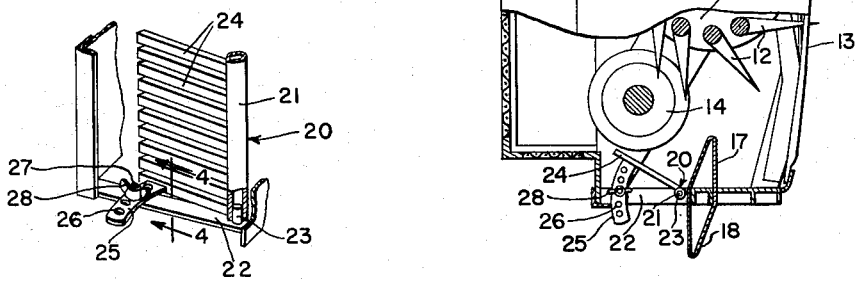
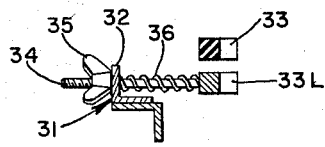
INVENTOR.
A.L. HUBBARD
BY William A. Murray
ATTORNEY

United States Patent Office 3,170,277
Patented Feb. 23, 1965

3,170,277
COTTON HARVESTER CLEANING SCREEN
Arthur L. Hubbard, Des Moines, Iowa, assignor to Deere & Company, Moline, Ill., a corporation of Delaware
Filed Nov. 23, 1962, Ser. No. 239,671
8 Claims. (Cl. 56—44)

This invention relates to a cotton harvester and more particularly to an improvement for a cotton harvester, the improvement residing in a grille structure contained within the cotton harvester and utilized for cleaning the cotton.

In the conventional type cotton harvester there is normally provided a housing structure composed of a pair of casings spaced apart to define a fore-and-aft extending plant passage. Contained in each of the casings is a harvesting drum having laterally extending spindles that upon rotation of the drum extend into the passage and snag or otherwise pick the cotton bolls from the plants. The spindles move the cotton bolls into an area of an upright doffing drum or mechanism which detaches the bolls from the spindles and drives them in the direction of a side conveyor on the outboard side of the casing. Co-operating with the spindle drum as well as the doffing drum are various baffles and grills utilized to remove and guide trash picked with the cotton bolls, and discharge the trash away from the housing. In effect therefore, the baffles and grilles operate as a means for cleaning the cotton.

With the above in mind, it is the primary object of the present invention to provide a new and novel type of grille structure cooperating with the doffing or spindle drums to eliminate the trash from the housing.

It is desirable to utilize the drum, in the particular instance to be shown as the doffing drum, to move the cotton across the grille structure so that the trash will pass through the openings of the grille structure. Since there is the frictional type of engagement between the cotton bolls and grille structure, it has in the past been necessary to place the grille sufficiently from the doffing drum to give a sufficiently large clearance for the cotton so that clogging does not occur. Normally the clearance is more than sufficient to permit passage. This large clearance does, of course, reduce somewhat the cleaning efficiency of the grille.

With the above in mind, it is also the primary object of the present invention to provide a grille pivoted at one upright edge and composed of a series of vertically spaced horizontal elements or bars extending generally tangentially with the doffing drum and generally from the pivot in the direction of movement of the cotton. The horizontal elements extend freely at the opposite edge and consequently cotton moving against the horizontal elements will move off the free ends. Due to the fact the horizontal elements provide a track or guide for the cotton to move and also due to their free ends, there is a considerable reduction in the frictional resistance to the cotton and consequently the entire grille structure may be placed closer to the doffing drum.

It is a further object of the present invention to utilize in the above type of grille structure a series of the aforementioned horizontal elements composed of rubber or other resilient material sufficiently rigid to operate in the conventional cleaning operation but upon momentary large accumulations of cotton between the grille and drum, to yield away from the drums to permit the accumulation to pass. By such action, clogging will not occur at the grille. Also, since the grille structure will yield away from the drum, the grille itself may normally be disposed relatively close to the drum so that the maximum cleaning effect of the grille may be utilized.

As a modification of the invention, it is proposed to mount the grille by resilient means so that the entire grille structure may yield away from the drum.

Other objects and advantages of the present invention will become apparent to those skilled in the art as the nature of the invention is better understood from the following disclosure and as shown in the accompanying drawings.

FIG. 1 is a rear perspective view of a portion of a conventional type cotton harvester utilizing the structure of the present invention.

FIG. 2 is a plan view with portions broken away of part of the cotton harvester.

FIG. 3 is a perspective view of the lower portion of the grille structure and its manner of attachment to the cotton harvester casing.

FIG. 4 is a sectional view taken substantially along the line 4—4 of FIG. 3.

FIG. 5 is a view somewhat similar to FIG. 3 but showing a modified form of the invention.

FIG. 6 is a sectional view taken substantially along the line 6—6 of FIG. 5.

Referring now to the drawings, the harvester is normally composed of a harvester housing having a pair of upright casings, one being indicated in its entirety by the reference numeral 10, disposed on opposite sides of a fore-and-aft plant passage receiving the cotton plants as the harvester advances. Contained within the casing 10 is an upright spindle drum 11 having a series of laterally extending picking spindles 12. The casing 10 has an open inner side defined by a series of horizontal bars 13 spaced vertically apart to permit the spindles 12 to extend into the plant passage for the purpose of harvesting cotton.

A doffing drum 14 is provided rearwardly and to one side of the spindle drum 11 and cooperates with the spindle drum 11 to remove cotton from the spindles 12. The drum 14 rotates in a clockwise direction, as viewed in FIG. 2, and tends to move the cotton in a direction rearwardly and outwardly to be collected in a door type compartment 15 having a suction pipe 16 opening into it for purposes of removing the cotton from the area of the housing 10.

The rear upright wall of the casing 10 is composed in part of an upright baffle structure having a forward portion 17 directed into the casing to a point closely adjacent the outer periphery of the spindles 12, and a rearwardly projecting portion 18 extending considerably rearwardly of the housing or casing 10.

In operation the spindles 12 will collect the cotton and some accumulation of trash and remove both within the casing 10. However, the centrifugal action of the drum 11 will cause much of the trash to depart from the spindles 12 and to impinge against the forward baffle portion 17 and be guided rearwardly and outwardly of the casing. The rearward baffle portion 18 guides the trash sufficiently rearwardly that it will not reaccumulate and again pass into the casing 10 due to the draft caused by suction pipe 16 and the rotation of the drum 14.

Outboard of the baffle structure is a grille, indicated in its entirety by the reference numeral 20, composed of an upright tube or pipe 21. The casing 10 also includes at the lower end of the grille a cross brace or bar 22 having an upwardly projecting stud 23 defining a pivot receiving the lower open end of the tube or pipe 21. A similar arrangement, not shown, is provided at the upper end of the tube 21 and consequently the entire grille structure 20 may, unless otherwise restricted, swing about the pivot axis of the stud 23.

The grille 20 is further composed of a series of horizontally disposed and outwardly projecting arms 24. The arms 24 extend from the tubular edge 21 to free ends adjacent the doffer drum 14. As may be seen in FIG. 2, the arms 24 extend generally in a tangential relation and closely to the periphery of the drum 14. As may be seen in FIG. 4, the arms 24 are composed of a relatively rigid rubber or yieldable compound and are therefore capable of yielding should a load be applied against them. The lower arm 24L is, however, composed of metal and has fixed thereto an arcuate shaped metal bracket 25 extending rearwardly over the brace 22. The bracket 25 has a series of arcuately spaced openings 26 therein that may receive a bolt 27 projecting upwardly from the plate 22 and be locked in any of the respective openings 26 by means of a thumb nut 28. A similar arcuate bracket, as is shown at 29 (FIG. 1), is provided for the uppermost arm or bar 24 and may similarly be adjusted in its angular disposition by a bolt and nut combination, not shown, which connects the uppermost bar to the casing 10.

In operation cotton is removed from the picking spindles 12 by the doffing drum 14 and is directed toward the door or compartment 15. The cotton must pass adjacent the bars 24. However, as the cotton passes against or closely to the bars 24, the trash with the cotton tends to pass between the respective bars 24. Adjustment of the grille 20, such as is provided at 26, 27 and 28, is advantageous for maximum efficiency since various fields will produce different size cotton bolls having different characteristics and different type and variations of trash, and consequently the bars 24 may be adjusted relative to the doffer drum 14 for maximum efficiency depending upon the conditions. By providing the arms 24 to have completely free ends at their outermost ends, there is no restriction at that end of the grille tending to prevent passage of cotton. For example, if there were a bar at the free ends of the arms 24 there would be a restriction and cotton would tend to build up at the bar. Once begun, the cotton would quickly accumulate and a clogging condition would exist. However, by having free ends, the cotton will merely slide off of those ends and in effect tend to clean the bars 24. This self cleaning action of the grille 20 becomes particularly important since the grille 20 may be positioned considerably closer to the doffing drum 14 than might otherwise occur.

Should at any time clogging begin to occur, there will normally be sufficient force created by the drum and the cotton accumulating between the grille and the drum to cause the flexible arms 24 to yield away from the drum to permit the clogging condition to be relieved. Again, therefore, the entire grille 20 may be placed close to the doffer 14 without generally creating a structure which will cause clogging. It should be generally understood that in most instances the closer the grille is to the doffer drum 14, the more effective the cleaning action by the grille.

In the modification shown in FIGS. 5 and 6, there is provided an upright tube 30 pivotally mounted on the transverse bar 31 at the lower rear edge of the casing 10. The bar 31 is of angle iron construction having a vertical flange 32. Horizontal arms or bars 33 extend outwardly from the tube 30 and may be composed either of relatively rigid rubber as shown in FIG. 4, or may be composed of metal rods. The lowermost rod 33L has a rearwardly projecting stud 34 extending through a suitable opening in the vertical flange 32. The stud 34 is threaded at its rear end to receive a nut 35 to thereby permit the entire grille to be adjustable toward or away from the doffing drum. Extending between the lower rod 33 and flange 32 and on the stud 34 is a coil spring 36 resiliently resisting movement of the grille away from the doffer drum 14.

The modification operates in similar manner to that of the previous form. However, rather than to have the individual rods or arms 33 yield rearwardly upon an accumulation of cotton, the entire grille structure is permitted rearward yielding movement by compressing the spring 36. Again, although not shown, a similar arrangement for mounting the grille structure is connected to the upper end of the grille structure and to the casing 10. Adjustment of the grille structure toward or away from the doffing drum 14 is afforded by threading the nuts 35 to the desired location.

While only two forms of the invention have been shown, it should be recognized that other forms and variations will occur to those skilled in the art. Therefore while the present forms are shown in concise and detailed manner for the purpose of completely illustrating the principles of the invention, it is not the intention to limit or narrow the invention beyond the broad concepts set forth in the appended claims.

What is claimed is:

1. In a cotton harvester including an upright casing having a side opening therein, an upright rotatable drum within the casing adjacent the opening directing movement of cotton in a certain direction, the invention comprising: structure defining an upright pivot on the casing at the opening; an upright cleaning grille in the casing bridging the opening and adjacent a side of the drum and supported on and extending from the pivot to an upright free edge spaced from the pivot, the grille being angularly disposed relative to the direction of movement of the cotton and in intercepting relation to the cotton whereby the cotton may impinge against the grille and be deflected toward and off of the free edge; and adjusting means on the casing connected to the cleaning grille for adjusting the angular disposition of the grille.

2. In a cotton harvester including an upright casing with an open side, an upright rotatable harvesting drum within the casing effective to move cotton in a certain direction, the invention comprising: structure on the casing defining an upright pivot spaced from the drum; an upright cleaning grille supported on the pivot and including a series of horizontal elements spaced apart vertically and supported on the pivot at one end and trailing generally in the direction of movement of the cotton to free ends spaced from the pivot and being relatively close to the drum, the elements being angularly disposed in regard to said direction of movement and in intercepting relation to the cotton whereby the cotton may impinge against the elements and be deflected toward and off of the free ends of the elements; and adjusting means on the casing connected to the cleaning grille for moving the grille toward or away from the drum.

3. In a cotton harvester including an upright casing with an open side, an upright rotatable harvesting drum within the casing effective to move cotton in a certain direction, the invention comprising: structure on the casing defining an upright pivot spaced from the drum; an upright cleaning grille supported on the pivot and a series of resilient horizontal elements spaced apart vertically and supported on the pivot at one end and trailing generally in the direction of movement of the cotton to free ends spaced from the pivot and being relatively close to the drum, the elements being angularly disposed in regard to said direction of movement and in intercepting relation to the cotton whereby the cotton may impinge against the elements and be deflected toward and off of the free ends of the elements.

4. In a cotton harvester including an upright casing, an upright rotatable drum within the casing directing movement of cotton in a certain direction, the invention comprising: structure defining an upright pivot on the casing; an upright cleaning grille in the casing adjacent a side of the drum and supported on and extending generally in the direction of movement of the cotton and from the pivot to an upright free edge spaced from the pivot, the grille being angularly disposed relative to the direction of movement of the cotton and in intercepting relation to the cotton whereby the cotton may impinge against the grille and be deflected toward and off of the free edge; and yieldable means on the casing connected to the cleaning grille for permitting the grille to momentarily yield away from the drum to permit passage between the drum and grille of accumulated cotton.

5. In a cotton harvester including an upright casing, an upright rotatable drum within the casing adapted to move cotton in a certain direction, the invention comprising: an upright cleaning grille adjacent a side of the drum and being disposed to permit the cotton to impinge against it; and structure including spring elements connecting the grille to the casing and capable of yielding to permit the grille to move outwardly upon pressure being applied to the side adjacent the drum.

6. In a cotton harvester including an upright casing, an upright rotatable drum within the casing adapted to move cotton in a certain direction, the invention comprising: an upright cleaning grille adjacent a side of the drum and being disposed to permit the cotton to impinge against it, the grille being composed of a series of rods of resilient composition capable of individually yielding outwardly upon pressure being applied to the side adjacent the drum.

7. In a cotton harvester including an upright casing, an upright rotatable drum within the casing adapted to move cotton in a certain direction, the invention comprising: an upright cleaning grille adjacent a side of the drum and being disposed to permit the cotton to impinge against it; structure on the casing supporting the cleaning grille thereon for movement toward or away from the doffing mechanism including means for locking the structure at any of a plurality of positions to thereby affect the relative positions between the doffing mechanism and grille.

8. The invention defined in claim 1 in which the grille is composed of a series of parallel grille elements of resilient composition so that the elements may yield away from the drum.

References Cited by the Examiner
UNITED STATES PATENTS

| | | | |
|---|---|---|---|
| 2,904,948 | 9/59 | Hubbard | 56—41 |
| 3,046,721 | 7/62 | Kowalik et al. | 56—41 |
| 3,114,997 | 12/63 | Folsom | 56—44 |

T. GRAHAM CRAVER, *Primary Examiner.*

ARNOLD RUEGG, RUSSELL R. KINSEY, *Examiners.*

UNITED STATES PATENT OFFICE
CERTIFICATE OF CORRECTION

Patent No. 3,170,277                                February 23, 1965

Arthur L. Hubbard

It is hereby certified that error appears in the above numbered patent requiring correction and that the said Letters Patent should read as corrected below.

Column 4, line 52, after "and" insert -- including --; column 6, lines 4 and 5 and line 7, strike out "doffing mechanism", each occurrence, and insert instead -- drum --.

Signed and sealed this 21st day of December 1965.

(SEAL)
Attest:

ERNEST W. SWIDER                                EDWARD J. BRENNER
Attesting Officer                                       Commissioner of Patents